March 22, 1927.
L. C. BLACK
ROTARY DRILL BIT
Filed June 18, 1923
1,621,921
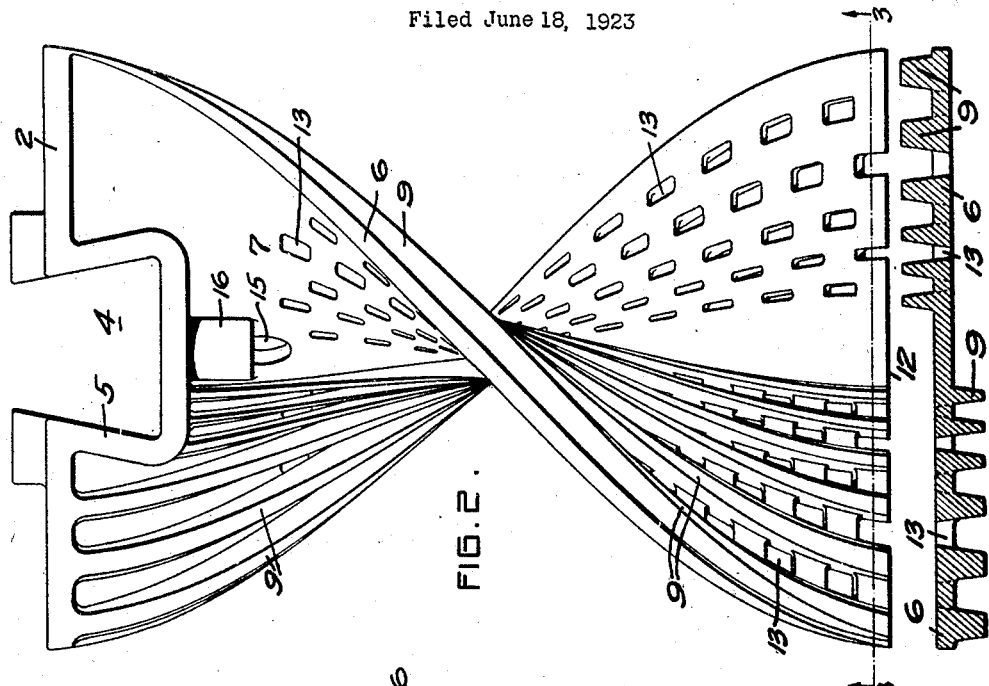
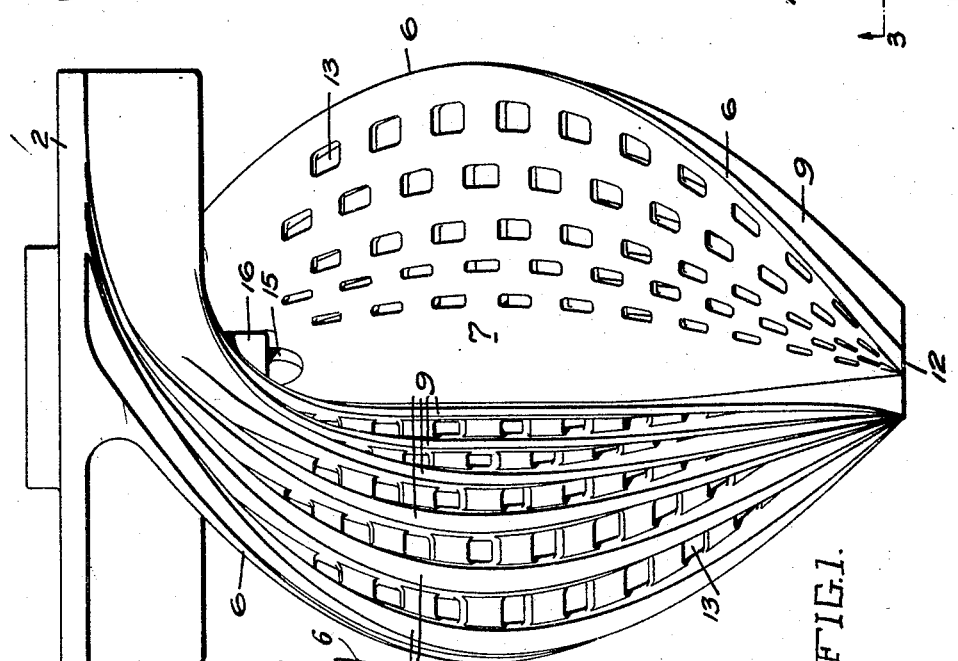
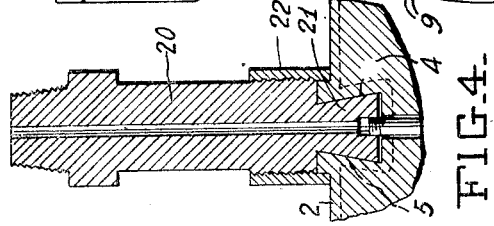
INVENTOR
Lester C. Block
BY
White Frost & Evans
his ATTORNEYS.

Patented Mar. 22, 1927.

1,621,921

UNITED STATES PATENT OFFICE.

LESTER C. BLACK, OF LOS ANGELES, CALIFORNIA.

ROTARY-DRILL BIT.

Application filed June 18, 1923. Serial No. 646,030.

The invention relates to rotary drill bits for use in drilling oil wells.

An object of the invention is to provide a self-sharpening or self-dressing rotary drill bit.

Another object of the invention is to provide a rotary drill bit having a toothed cutting edge, which is maintained as the cutting edge wears away due to contact with the formation being cut.

The invention possesses other advantageous features, some of which, with the foregoing will be set forth at length in the following description where I shall outline in full, that form of the invention which I have selected for illustration in the drawings accompanying and forming part of the present specification. In said drawings I have shown one form of drill bit embodying my invention, but it is to be understood that I do not limit myself to such form, since the invention, as set forth in the claims, may be embodied in a plurality of forms.

Referring to said drawings:

Figure 1 is a side elevation of the drill bit of my invention, the view being taken from a point in alignment with the cutting edge.

Figure 2 is a side elevation of the drill bit taken at right angles to Figure 1.

Figure 3 is a cross section taken on the line 3—3 of Figure 2.

Figure 4 shows the means of connecting the bit to the shank.

The drill bit shown in this application is an improvement of the drill bit shown in my copending application Serial Number 623,600, filed March 8th, 1923.

The drill bit of my invention comprises a head 2, having a transverse groove or socket 4, the side walls 5 of which are inclined downwardly and outwardly to form a socket of increasing width towards its base. The shank 20 of the drill tool is provided on its lower end with a projection 21 of increasing width towards its lower face and this projection is adapted to be moved transversely into the socket in the drill bit, to connect the drill tool with the drill bit. Means are provided, as shown in my prior application, such as a threaded collar 22, for rigidly securing the drill bit to the drill tool.

The drill bit is preferably made of a hard steel alloy, such as manganese steel, and comprises a cutting blade 6 having a helicoidal surface 7 forming a sharp angle with the formation to be cut, so that the abrasion of the formation maintains the cutting edge. The blade is integral with the head and has a surface generated by a narrow rectangle moving parallel to its surface and rotating about its axis of symmetry. The lower edge of the blade is perpendicular to the axis of symmetry and the width of the blade is constant for substantially its whole length so that the side edges of the blade serve as a reamer to maintain the diameter of the hole. The inclination of the blade to the horizontal is such that the blade is worn away by abrasive contact with the formation, its cutting edge is continually sharpened. The blade thus presents, at its cutting edge, two cutting edges diametrically opposed to each other with respect to the axis of symmetry of the blade. The blade is preferably a warped surface formed by the uniform rotation about a stationary axis of an element maintained parallel to a surface and moving uniformly from the surface, the axis passing thru the element. This produces a blade of constant inclination over its whole length, so that as the blade wears down, due to the abrasive action of the formation, the angle of inclination of the blade with respect to the formation remains constant.

It is not essential, however, that this constant angle of inclination be maintained, but it is preferable. By forming the blade in this manner and by making it out of a very hard steel alloy, the blade continually redresses itself during its rotation against the formation and can be used continuously until it is practically all worn away. The construction allows a maximum amount of metal to be worn away from the lower or cutting edge of the bit without necessitating removal of the bit from the well for the purpose of dressing.

I have found that better results in drilling are obtained by providing the helicoidal blade on its rear surfaces at opposite sides of the axis of symmetry, with helical ribs 9, extending from the cutting edge 12, of the blade to the head 2; the ribs extend in a helical path and are parallel with each other and form projections on the rear side of the cutting edge thereby reinforcing the blade and improving its cutting qualities and reducing wear. The ribs 9 are preferably of increasing cross sectional area as they progress outwardly from the axis of symmetry, that is, each successive rib, progressing outwardly is of greater cross sectional area than the adjacent rib lying toward the axis. Also the spacing between the ribs is preferably increased between the successive ribs, progressing outwardly from the axis. In operation, the metal between the ribs, wears down faster than the ribs, so that the cutting edge of the blade assumes a toothed form, which produces better cutting quality. These ribs are constructed in this manner because at the outer edge of the blade the cutting edge travels thru a much larger arc and consequently is subjected to a greater abrasion, but by increasing the cross sectional area of the ribs the outer portion of the cutting edge wears down at substantially the same speed as the inner portion. Thus the cutting edge maintains substantially its original angular relation to the axis of rotation as it wears down in use.

This condition may be further enhanced by positively forming teeth along the cutting edge of the blade, and providing means for maintaining these teeth, as the cutting edge is worn away. To accomplish this result I provide the blade with a plurality of series of apertures 13, extending from the cutting edge upwardly toward the head. Each series of apertures preferably lie in a helicoidal path and the apertures in two adjacent series are staggered in respect to each other, so that the blade is not materially weakened, by the inclusion of the apertures. The apertures are preferably formed between the ribs and are preferably of increasing width outwardly from the axis, so that heavier teeth will be formed at the outer portion of the cutting edge. As the cutting edge is worn away, successive rows of apertures are brought to the cutting edge and form teeth, so that a toothed cutting edge is always maintained.

The blade is provided, below the head, with an aperture 15 which establishes a direct communication between opposite sides of the blade. This aperture 15 lies directly below the hollow boss 16 in which a pipe, thru which water or mud is circulated, is disposed, so that the water or mud may flow freely from the pipe into the drill hole. The helicoidal surface of the bit serves to raise the material cut by the cutting edge into the zone of influence of the circulating mud or water stream, so that the material cut is quickly removed from the drill hole.

The ribs are broadest where they merge into the back of the blade, and run back on a double taper, so that the back face of the rib is narrower than the front face, thus making key-stone shaped ribs, with the broad face toward the blade. Thus the rib has a varying section in contact with the formation, with the broadest portion forming the cutting edge and tapering so as to give a constantly smaller section towards the back of the rib. This will permit the abrasive action of the formation caused by the rotation of the drill, to wear away the rib in a horizontal plane, thus allowing the rib to present a constantly sharp cutting edge to the formation. The apertures in the blade are formed in horizontal rows and are staggered in the successive rows and the apertures in one row terminate in the horizontal plane of the lower edge of the apertures in the next upper row, so that as the cutting face is worn away, teeth are continually formed along the cutting edge.

I claim:—

1. A rotary drill bit comprising a cutting blade having a helicoidal surface forming a sharp angle with the formation to be cut and helicoidal ribs on the rear surfaces of the blade on opposite sides of the axis of the helicoid, said surface terminating in substantially alined cutting edges, the ribs extending to the cutting edge of the blade, the end faces of the ribs lying in a horizontal plane.

2. A rotary drill bit comprising a cutting blade having a helicoidal surface forming a sharp angle with the formation to be cut and helicoidal ribs on the rear surfaces of the blade, the successive ribs from the axis to the outer edge of the blade increasing in cross-sectional area.

3. A rotary drill bit comprising a cutting blade having a helicoidal surface forming a sharp angle with the formation to be cut and helicoidal ribs of decreasing width backwardly on the rear surface of the blade, the ribs extending to the cutting edge of the blade with the ends of the ribs and the cutting edge lying in the same horizontal plane.

4. A rotary drill bit comprising a cutting blade having a helicoidal surface forming a sharp angle with the formation to be cut and helicoidal ribs on the rear surfaces of the blade on opposite sides of the axis of the helicoid, the successive ribs from the axis to the outer edge of the blade increasing in cross sectional area, the ends of the ribs lying in the horizontal plane of the cutting edge of the blade.

5. A rotary drill bit comprising a cutting blade having a helicoidal surface forming a sharp angle with the formation to be cut, said blade being provided with a plurality of series of apertures which form teeth along the cutting edge of the blade as the cutting edge is worn away.

6. A rotary drill bit comprising a cutting blade having a helicoidal surface forming a sharp angle with the formation to be cut, said blade being provided with a plurality of helically disposed series of apertures, the apertures in one series being staggered with relation to the apertures in the adjacent series, and the successive series from the axis to the outer edge of the blade being spaced a greater distance from the next inner series.

7. A rotary drill bit comprising a cutting blade having a helicoidal surface forming a sharp angle with the formation to be cut, said blade being provided with a plurality of series of apertures, the apertures in each series lying in a helix and the apertures in the successive series outward from the axis of the helicoid being of increasing area.

8. A rotary drill bit comprising a cutting blade having a helicoidal surface forming a sharp angle with the formation to be cut and helicoidal ribs on the rear surface of the blade, the blade being provided with series of apertures between the ribs.

9. A rotary drill bit comprising a cutting blade having a helicoidal surface forming a sharp angle with the formation to be cut and helicoidal ribs on the rear surface of the blade, the blade being provided, between the ribs, with a series of apertures, the apertures in one series being staggered with respect to the apertures in an adjacent series.

10. A rotary drill bit comprising a cutting blade having substantially alined cutting edges rotatable about an axis of symmetry and ribs formed on the rear surfaces of the blade and extending to the cutting edge, the ribs serving to form teeth along the cutting edge of the blade and terminating at their ends in surfaces lying in the plane of the cutting edge.

11. A rotary drill bit comprising a cutting blade portion having a helicoidal surface forming a sharp angle with the formation to be cut, said blade being rotatable about an axis of symmetry and having a cutting edge extending outwardly from said axis, helicoidal ribs on the rear surface of the blade extending to the cutting edge, the ends of the ribs lying in the plane of the cutting edge, said blade being provided between the ribs with spaced apertures arranged to form teeth as the cutting edge is worn away.

12. A rotary drill bit comprising a cutting blade portion having a helicoidal surface forming a sharp angle with the formation to be cut, said blade being rotatable about an axis of symmetry and having a cutting edge extending outwardly from said axis, helicoidal ribs on the rear surface of the blade extending to the cutting edge, the successive ribs from the axis to the outer edge of the blade increasing in cross-sectional area, the ends of the ribs lying in the plane of the cutting edge, whereby the ribs serve to maintain substantially even wear over the length of the cutting edge as the blade is rotated about its axis of symmetry against the formation.

13. A self-sharpening drill bit comprising a blade portion, means for rotating said blade portion about an axis disposed angularly with respect to the front surface of said portion, a section of said portion taken along a plane normal to said axis having a major dimension measured in a direction radial to said axis, said portion having a cutting edge extending outwardly from said axis of rotation, and means comprising a plurality of apertures in said blade for causing said cutting edge to assume a jagged contour as it wears away in use.

In testimony whereof, I have hereunto set my hand.

LESTER C. BLACK.